(12) United States Patent
Hirota

(10) Patent No.: US 8,469,529 B2
(45) Date of Patent: Jun. 25, 2013

(54) DISPLAY DEVICE

(75) Inventor: Hideyuki Hirota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 13/322,377

(22) PCT Filed: Aug. 17, 2009

(86) PCT No.: PCT/JP2009/003908
§ 371 (c)(1),
(2), (4) Date: Nov. 23, 2011

(87) PCT Pub. No.: WO2011/021233
PCT Pub. Date: Feb. 24, 2011

(65) Prior Publication Data
US 2012/0069585 A1    Mar. 22, 2012

(51) Int. Cl.
*G01D 11/28* (2006.01)
(52) U.S. Cl.
USPC ................ 362/29; 362/23; 362/85; 200/316
(58) Field of Classification Search
USPC ............. 362/23, 26, 30, 85, 249.02, 249.05, 362/249.12; 200/310, 316, 317, 336
See application file for complete search history.

(56) References Cited

U.S. PATENT DOCUMENTS

| | | | | |
|---|---|---|---|---|
| 5,572,239 A | * | 11/1996 | Jaeger | 345/172 |
| 6,111,240 A | * | 8/2000 | Kishimoto et al. | 219/720 |
| 6,441,806 B1 | * | 8/2002 | Jaeger | 345/172 |
| 7,059,735 B2 | * | 6/2006 | Orikasa | 362/23 |
| 7,105,759 B1 | * | 9/2006 | Mucha | 200/310 |
| 2002/0018340 A1 | * | 2/2002 | Okamoto | 361/807 |
| 2003/0221498 A1 | | 12/2003 | Mere et al. | |
| 2005/0063168 A1 | * | 3/2005 | Miyasaka | 362/26 |
| 2008/0289940 A1 | * | 11/2008 | Kim et al. | 200/336 |
| 2010/0214213 A1 | * | 8/2010 | Bowden et al. | 345/157 |

FOREIGN PATENT DOCUMENTS

| | | |
|---|---|---|
| DE | 10324831 A1 | 12/2003 |
| JP | 5-4541 A | 1/1993 |
| JP | 5-67068 U | 9/1993 |
| JP | 2000-250692 A | 9/2000 |
| JP | 2000-251566 A | 9/2000 |
| JP | 2002-117748 A | 4/2002 |
| JP | 2005-209923 A | 8/2005 |
| JP | 2005-221850 A | 8/2005 |
| JP | 2006-47624 A | 2/2006 |

* cited by examiner

*Primary Examiner* — Hargobind S Sawhney

(74) *Attorney, Agent, or Firm* — Birch, Stewart, Kolasch & Birch, LLP

(57) ABSTRACT

A display device includes, within a panel formed of a front panel 11 and a rear panel 12, a switchboard 80 disposed in proximity to the front panel 11; a display board 20 disposed in proximity to the rear panel 12; a display 40 disposed between the switch board 80 and the display board 20; a switch mounting section 20a formed by protruding laterally at least a portion of the display board 20 from the display 40; a rotary switch 70 attached to the switch mounting section 20a; and an operation knob 90 attached to a shaft of the rotary switch 70 extended through the switch board 80 and the front panel 11.

4 Claims, 3 Drawing Sheets

DISPLAY DEVICE

TECHNICAL FIELD

The present invention relates to a display device having a rotary encoder, for example.

BACKGROUND ART

In a display device, a panel constituted by a front panel and a rear panel, for instance, includes a switch board disposed in proximity to the front panel and a display board disposed in proximity to the rear panel. A pressure type of push switch and/or a rotary type of rotary encoder are disposed on the switch board, and a button of the push switch and/or an operation knob attached to a shaft of the rotary encoder are protruded on the surface of the front panel.

Also, for the switches, there is disclosed a technology in which a user can easily see the switch even in a dark place. For example, according to Patent Document 1, an LED (Light Emitting Diode) as a light source for switch illumination is provided on a switch board, and the light from the LED illuminates a button through the back thereof.

In a display device, when a switch in Patent Document 1 is employed, an arrangement position of the switch board is set to be in proximity to a front panel, in consideration of the illumination range and evenness of lighting for a switch button and a switch knob and the operation feeling of a push switch. Since a rotary encoder is attached on a switch board, it is disposed protrusively from the front panel, and an operation knob is attached to the shaft of the rotary encoder.

PRIOR ART DOCUMENTS

Patent Documents

Patent Document 1: JP-A-2002-117748

However, the amount of projection of the operation knob, attached to the shaft of the rotary encoder, from the front panel is regulated by a law in European region from the viewpoint of safety; thus, there is a problem such that according to the construction of the conventional display device, the above amount of projection raises an issue.

Further, the arrangement position in depth of the switchboard is set, in consideration of the amount of projection of the rotary encoder from the front panel, the illumination range and evenness of lighting for the switches, and the operation feeling of a push switch, resulting in a large number of restrictions; thus, there is a problem such that it is difficult to set the optimum arrangement positions thereof.

The present invention has been made to solve the above-mentioned problems, and an object of the invention is to provide a display device that suppresses the amount of projection from a front panel of a rotary encoder, and also reducing the restrictions of the arrangement position of a switch board.

SUMMARY OF THE INVENTION

A display device according to the present invention includes, within a panel formed of a front panel and a rear panel, a switch board disposed in proximity to the front panel; a display board disposed in proximity to the rear panel; a display disposed between the switch board and the display board; a switch mounting section formed by projecting peripherally at least a portion of the display board from the display; a rotary encoder attached to the switch mounting section; and an operation knob attached to a shaft of the rotary encoder extended through the switch board and the front-panel.

According to the display device of the invention, it is arranged that within the panel formed of the front panel and the rear panel, the switch board is disposed in proximity to the front panel, the display board is disposed in proximity to the rear panel, and the rotary encoder is disposed on the display board. Thus, there is provided an advantageous effect that enables to suppress the amount of projection of the rotary encoder from the front panel. Further, the arrangement position in depth of the switchboard is unaffected by the placement of the rotary encoder, and thus the restrictions on the arrangement position of the switchboard can be reduced. As a result, there is provided an advantageous effect of increasing flexibility in the arrangement position of the switch board.

BRIEF DESCRIPTION OF THE DRAWINGS

FIG. 3(a) is a view showing a case where the rotary encoder is disposed on a display board, and FIG. 3(b) is a view showing a case where the rotary encoder is disposed on a switch board.

BEST MODE FOR CARRYING OUT THE INVENTION

In the following, embodiments to implement the present invention will be described with reference to the appended drawings in order to explain the invention in more detail.

First Embodiment

The configuration of a display device according to a first embodiment will now be discussed with reference to FIG. 1 and FIG. 2.

Figure 1:
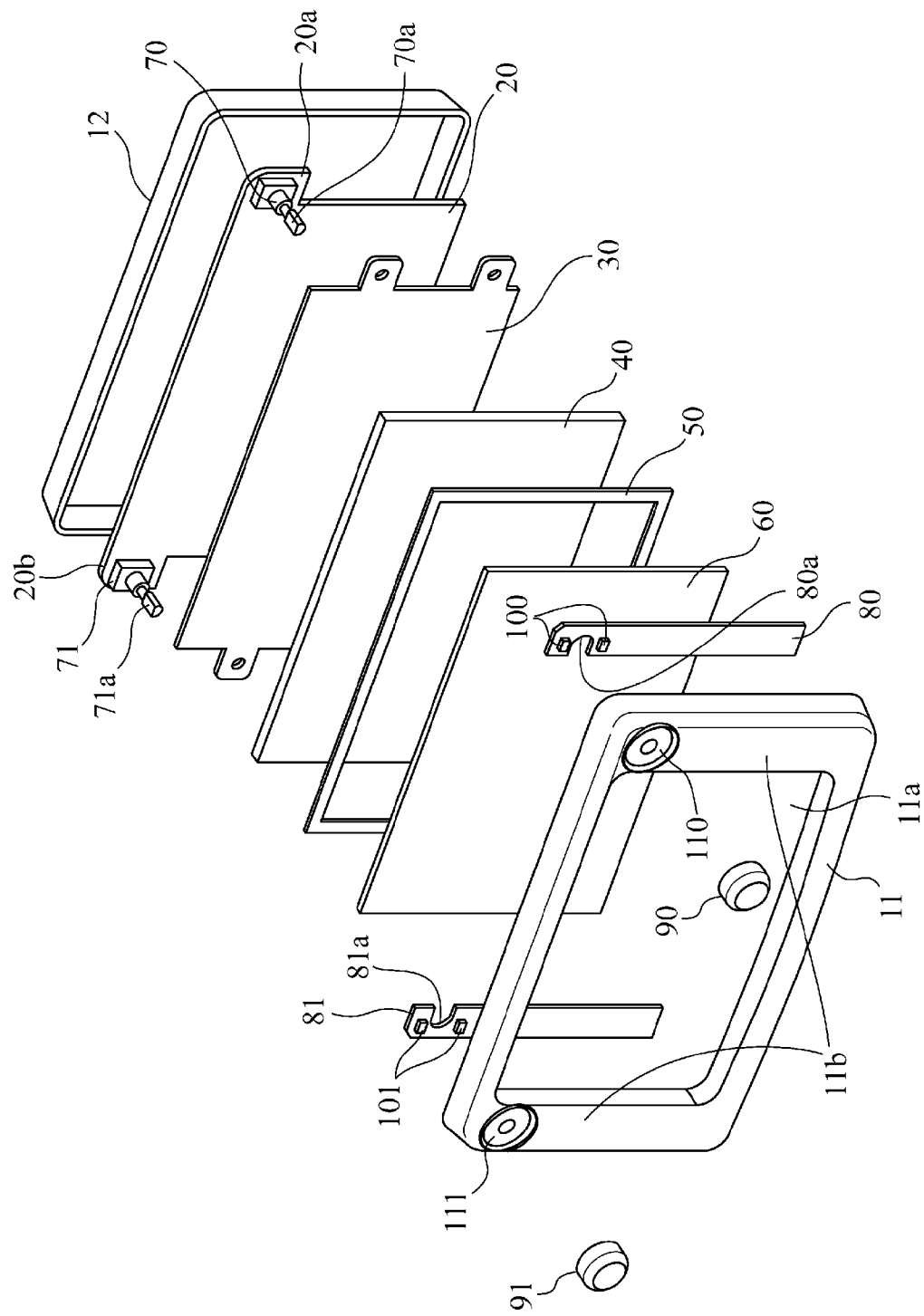
FIG. 1 is an exploded perspective view showing the configuration of a display device according to a first embodiment.

For example, as shown in FIG. 1, the display device is composed of: a front panel 11; a rear panel 12; a display board 20; a display board holder 30; a display 40; a touch panel holder 50; a touch panel 60; rotary encoders 70, 71; switch boards 80, 81; operation knobs 90, 91; light sources 100, 101; and prisms 110, 111.

The front panel 11 and the rear panel 12 support the internal components as a chassis of the display device, the front panel 11 is formed of a frame having an opening 11a working as a display unit, and various switches are disposed on the surface of the two sides 11b of the frame. For example, the display board 20, the display board holder 30, the display 40, the touch panel holder 50, and the touch panel 60 are disposed on the back of the opening 11a. Further, the rotary encoders 70, 71, the switch boards 80, 81, the light sources 100, 101, and the prisms 110, 111 are disposed on the back of the two sides 11b of the frame, and the operation knobs 90, 91 are provided on the front of the two sides 11b of the frame.

The display board 20 is disposed in proximity to the rear panel 12, and the display 40 is disposed between the switch board 80 and the display board 20. The display board 20 and the display 40 are supported by the display board holder 30, and the display board holder 30 is fixed to the front panel 11 or the rear panel 12 by screws or the like.

The touch panel 60 is disposed on the front of the display 40, and is supported by the touch panel holder 50.

Hereupon, in the display board 20, as shown in FIG. 1, switch mounting sections 20a, 20b are formed by protruding at least a portion of the display board 20 laterally (sidewise from the upper portions thereof in FIG. 1) from the display 40, as compared to the outside shapes of the display board holder 30, the display 40, the touch panel holder 50, and the touch panel 60. Note that in FIG. 1, an example where the switch mounting sections 20a, 20b are formed by protruding the display board 20 laterally from the display 40 is shown; however, it has only to be arranged that the display board 20 is protruded in at least one direction from the periphery of the display 40 to form the switch mounting section 20a or the switch mounting section 20b.

The rotary encoders 70, 71 each include a rotary switch larger than a pressure type of push switch, and convert, e.g., a rotational displacement caused by the operation of a user into an electrical signal. The rotary encoders 70, 71 are attached to the switch mounting sections 20a, 20b of the display board 20, as shown in FIG. 1 and FIG. 2, and shafts 70a, 71a of the rotary encoders 70, 71 extend through the switch boards 80, 81 and the two sides 11b of the frame of the front panel 11, respectively.

The switchboards 80, 81 are disposed in proximity to the front panel 11 as shown in FIG. 1, and arranged between the two sides 11b of the frame of the front panel 11 and the switch mounting sections 20a, 20b of the display board 20, respectively. Moreover, through-sections 80a, 81a are provided through the switch boards 80, 81 for expanding the shafts 70a, 71a of the rotary encoders 70, 71 therethrough to cause the shafts 70a, 71a to reach the vicinity of the surface of the front panel 11. Contact points related to various switches and the circuits of wiring patterns are formed on the surface of the switch boards 80, 81 and the circuits are electrically connected with the rotary encoders 70, 71.

Figure 2:
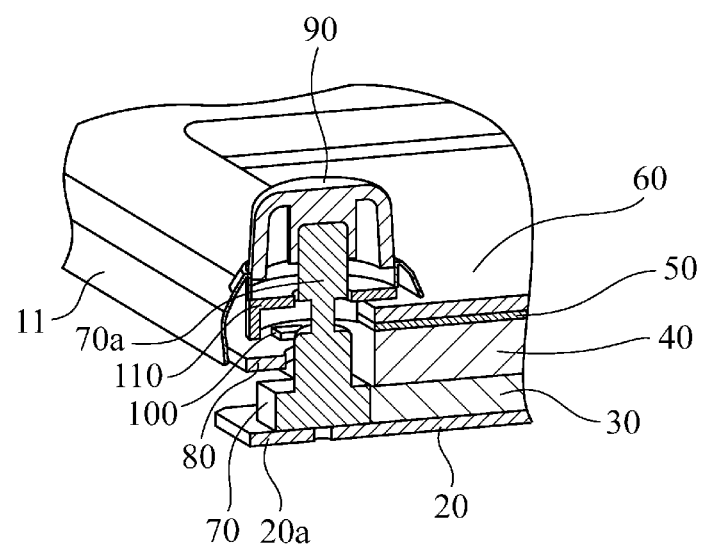
FIG. 2 is a partially cutaway view of the display device of the first embodiment.

As shown in FIG. 1 and FIG. 2, the operation knobs 90, 91 are attached to the tips of the shafts 70a, 71a of the rotary encoders 70, 71 extended through the switch boards 80, 81, and the two sides 11b of the frame of the front panel 11, and are provided so that a user can easily perform a rotation operation. The light sources 100, 101 emit light through the back of the operation knobs 90, 91, and include LEDs provided on the surfaces of the switch boards 80, 81 as shown in FIG. 1 and FIG. 2, for instance. As shown in FIG. 2, the prisms 110, 111 are disposed between the light sources 100, 101 and the operation knobs 90, 91, respectively, and attached to the front panel 11. The prisms diffuse light from the light sources 100, 101 to emit light through the back of the operation knobs 90, 91.

Incidentally, the following composition has been discussed in FIG. 1: the rotary encoders 70, 71 are provided on the switch mounting sections 20a, 20b formed on both the sides of the display board 20, respectively; however, when one rotary encoder is used, one switch mounting section has only to be formed.

Figure 3:
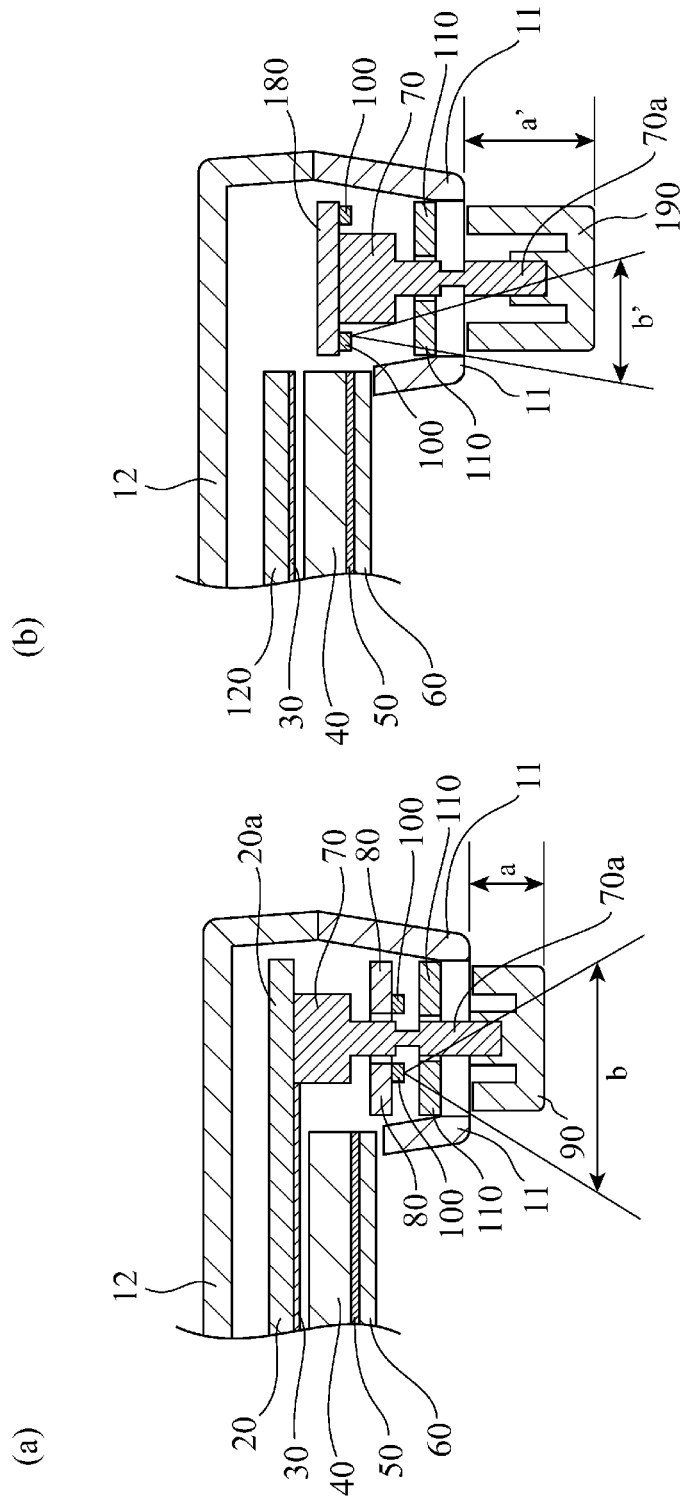
FIG. 3 is a schematic sectional view showing a disposition state of a rotary encoder.

Next, the arrangement state of the rotary encoder 70 of the display device will be discussed with reference to FIG. 3(a) and FIG. 3(b). FIG. 3(b) shows a case where a display board 120 has no switch mounting sections 20a, 20b, and the rotary encoder 70 is disposed on a switchboard 180. As shown in FIG. 3(b), an operation knob 190 attached to the shaft 70a of the rotary encoder 70 projects from the front panel 11, and the amount a' in which the operation knob 190 attached to the shaft 70a projects from the front panel 11 is large. Also, the light passed through the prism 110 from the light source 100 is partially intercepted by the rotary encoder 70, and thus the illumination range b' to the operation knob 190 is narrowed.

On the other hand, as shown in FIG. 3(a), the rotary encoder 70 is disposed on the switch mounting section 20a of the display board 20, and the amount a in which the operation knob 90 attached to the shaft 70a of the rotary encoder 70 projects from the front panel 11 is smaller. Also, the light passed through the prism 110 from the light source 100 is not intercepted, and the range b to the operation knob 90 is widened. Moreover, the light source 100 shown in FIG. 3(a) can be disposed nearer to the central axis of the rotary encoder 70 than the light source 100 shown in FIG. 3(b), and thus the illumination range extends even to the outside (outer peripheral direction) of the operation knob 90.

As discussed above, according to the first embodiment, within the panel formed of the front panel 11 and the rear panel 12, the switch board 80 is disposed in proximity to the front panel 11; the display board 20 is disposed in proximity to the rear panel 12; the display 40 is disposed between the switch board 80 and the display board 20; the switch mounting sections 20a, 20b are formed by protruding at least a portion of the display board 20 peripherally farther than the display 40; the rotary encoders 70, 71 are attached to the switch mounting sections 20a, 20b, respectively; and the operation knobs 90, 91 are attached to the shafts 70a, 70b of the rotary encoders 70, 71 extended through the switch boards 80, 81, respectively, and the front panel 11. Thus, there is provided an advantageous effect that enables to suppress the amount of projection of the operation knobs 90, 91, which are attached to the shafts 70a, 70b of the rotary encoders 70, 71, from the front panel 11. Further, the positions where the switch boards 80, 81 are disposed are unaffected by the placement of the rotary encoders 70, 71, and thus the restrictions on the positions where the switch boards 80, 81 are disposed can be reduced; as a result, there is provided an advantageous effect of increasing flexibility in the positions where the switch boards 80, 81 are disposed.

Further, the light sources 100, 101 are provided on the surfaces of the switch boards 80, 81, and the rotary encoders 70, 71 are provided on the switch mounting sections 20a, 20b of the display board 20 located more interiorly than the switchboards 80, 81; thus, there is provided an advantageous effect of preventing the light from the light sources 100, 101 from being intercepted by the rotary encoders 70, 71 and increasing the illumination range from the light sources 100, 101. Moreover, the light from the light sources 100, 101 is not intercepted by the rotary encoders 70, 71, and thus there is provided an advantageous effect of easily adjusting the illumination evenness.

Furthermore, the prisms 110, 111 are disposed between the light sources 100, 101 and the operation knobs 90, 91, respectively. Thus, there is provided an advantageous effect of diffusing the light from the light sources 100, 101 to be able to light the operation knobs 90, 91, and increasing the illumination range.

In addition, the rotary encoders 70, 71 are disposed on the switch mounting sections 20a, 20b formed on the display board 20 to be originally contained in the display device; thus, there is provided an advantageous effect of keeping the number of components.

INDUSTRIAL APPLICABILITY

As discussed above, according to the display device of the present invention, it is possible to reduce the amount in which the operation knob attached to the shaft of the rotary encoder projects from the front panel by disposing the switch board in proximity to the front panel; forming the switch mounting sections by protruding peripherally at least a portion of the display board disposed in proximity to the rear panel; attaching the rotary encoders to the switch mounting sections; and attaching the operation knobs to the shaft of the rotary encoder extended through the switch board and the front panel. Thus, the display device is suitable for a display device of a vehicle-mounted electronic apparatus.

The invention claimed is:

1. A display device comprising, within a panel formed of a front panel and a rear panel:
- a switch board disposed in proximity to the front panel;
- a display board disposed behind the switch board and in proximity to the rear panel;
- a display disposed behind the switch board and in front of the display board;
- a switch mounting section formed by protruding peripherally at least a portion of the display board from the display;
- a rotary encoder attached to the switch mounting section; and
- an operation knob attached to a shaft of the rotary encoder extended through the switch board and the front panel,
- wherein a light source is provided on the surface of the switch board.

2. The display device according to claim 1, wherein the light source is disposed in such manner as to light the operation knob.

3. The display device according to claim 1, wherein a prism is disposed between the light source and the operation knob.

4. The display device according to claim 1, wherein the switch mounting section is disposed on the same plane as the display board.

* * * * *